US008266300B2

(12) United States Patent
Jo

(10) Patent No.: US 8,266,300 B2
(45) Date of Patent: *Sep. 11, 2012

(54) SYSTEM AND METHOD FOR PLUG AND PLAY BETWEEN HOST AND CLIENT

(75) Inventor: Bae Su Jo, Ulsan (KR)

(73) Assignee: Boadin Technology, LLC, Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/287,074

(22) Filed: Nov. 1, 2011

(65) Prior Publication Data
US 2012/0066398 A1 Mar. 15, 2012

Related U.S. Application Data

(63) Continuation of application No. 11/577,107, filed as application No. PCT/KR2005/003421 on Oct. 13, 2005, now Pat. No. 8,078,732.

(30) Foreign Application Priority Data

Oct. 13, 2004 (KR) .................. 10-2004-0081882
Oct. 13, 2005 (KR) .................. 10-2005-0096477

(51) Int. Cl.
*G06F 15/16* (2006.01)
*G06F 3/00* (2006.01)
(52) U.S. Cl. ...................................... 709/227; 719/321
(58) Field of Classification Search .......... 709/220–227; 719/321
See application file for complete search history.

(56) References Cited

U.S. PATENT DOCUMENTS

| 4,712,727 | A  | * | 12/1987 | Wyberg ................ 229/249 |
| 6,300,863 | B1 | * | 10/2001 | Cotichini et al. ......... 340/5.8 |
| 6,496,862 | B1 | * | 12/2002 | Akatsu et al. ............ 709/224 |
| 6,618,764 | B1 | * | 9/2003 | Shteyn ................. 709/249 |
| 6,625,641 | B1 | * | 9/2003 | Hare et al. ............. 709/203 |
| 6,704,824 | B1 |   | 3/2004 | Goodman ............... 710/300 |
| 6,735,619 | B1 | * | 5/2004 | Sawada ................ 709/212 |
| 6,772,420 | B1 | * | 8/2004 | Poger et al. ............ 719/327 |
| 6,789,111 | B1 | * | 9/2004 | Brockway et al. ........ 709/222 |
| 7,137,565 | B2 |   | 11/2006 | Van Overbeke et al. .... 235/492 |
| 7,146,412 | B2 | * | 12/2006 | Turnbull ............... 709/220 |
| 7,219,146 | B2 | * | 5/2007 | Inagaki et al. .......... 709/224 |
| 7,280,843 | B2 | * | 10/2007 | Lection et al. ......... 455/556.1 |
| 7,287,257 | B2 | * | 10/2007 | Meza ................... 719/321 |
| 7,293,117 | B2 |   | 11/2007 | Ohta ................... 710/10 |
| 7,401,113 | B1 | * | 7/2008 | Appiah et al. .......... 709/203 |
| 7,483,963 | B2 | * | 1/2009 | Zhang et al. ........... 709/220 |

(Continued)

*Primary Examiner* — Krisna Lim
(74) *Attorney, Agent, or Firm* — Patrick E. Caldwell, Esq.; The Caldwell Firm, LLC

(57) ABSTRACT

A system, method, and computer program product are provided for plug and play between a host and client. The system includes a client device configured to be communicatively connected to a host device, the client device including at least a portion of memory configured to store computer code for allowing the host device to identify and control the client device. Additionally, the client device is configured such that the host device is not required to have pre-installed the computer code for allowing the host device to identify and control the client device, prior to being communicatively connected to the client device, and the client device is further configured such that when the client device is communicatively connected to the host device, the client device is configured to transfer the computer code for allowing the host device to identify and control the client device to the host device for installation.

39 Claims, 15 Drawing Sheets

U.S. PATENT DOCUMENTS

| | | | |
|---|---|---|---|
| 7,668,986 B2* | 2/2010 | Lowe et al. | 710/62 |
| 7,710,937 B2 | 5/2010 | Yoshida | 370/342 |
| 7,912,987 B2* | 3/2011 | Zhong et al. | 709/250 |
| 7,945,919 B2* | 5/2011 | Hara et al. | 719/327 |
| 2002/0065872 A1* | 5/2002 | Genske et al. | 709/202 |
| 2002/0069353 A1* | 6/2002 | Smith | 713/1 |
| 2002/0095501 A1* | 7/2002 | Chiloyan et al. | 709/227 |
| 2002/0174264 A1* | 11/2002 | Fuller et al. | 709/321 |
| 2003/0041127 A1* | 2/2003 | Turnbull | 709/220 |
| 2003/0078036 A1* | 4/2003 | Chang et al. | 455/419 |
| 2003/0120624 A1* | 6/2003 | Poppenga et al. | 707/1 |
| 2003/0195951 A1* | 10/2003 | Wittel et al. | 709/220 |
| 2003/0208698 A1* | 11/2003 | Chou et al. | 713/202 |
| 2004/0073912 A1* | 4/2004 | Meza | 719/321 |
| 2005/0160157 A1* | 7/2005 | Collier et al. | 709/222 |
| 2006/0082817 A1* | 4/2006 | Crosier et al. | 358/1.15 |
| 2006/0100010 A1 | 5/2006 | Gatto et al. | 463/29 |
| 2007/0047524 A1* | 3/2007 | Moriya | 370/352 |
| 2007/0088893 A1* | 4/2007 | Carnahan | 710/302 |

* cited by examiner

SYSTEM AND METHOD FOR PLUG AND PLAY BETWEEN HOST AND CLIENT

RELATED APPLICATIONS

This application is a continuation of U.S. patent application Ser. No. 11/577,107 filed on Oct. 31, 2008 now U.S. Pat. No. 8,078,732, which is a national stage entry of PCT/KR05/03421 filed on Oct. 13, 2005, which claims priority from foreign Republic of Korea Application No. 10-2005-0096477 filed on Oct. 13, 2005, and also claims priority from foreign Republic of Korea Application No. 10-2004-0081882 filed on Oct. 13, 2004.

TECHNICAL FIELD

The present invention relates to a system for controlling one or more client with a host, and more particularly, to a system and method for plug-and-play between a host and a client capable of controlling the client at the same time that the client is connected to the host through wired/wireless communication means.

BACKGROUND ART

The Internet has been widely used. In home, the Internet has also been required. Home network middleware techniques such as JINI and UPnP are provided, so that application programmers can control and manage devices installed in in-home network. Accordingly, users can control and manage electronic appliances and security systems in home.

In general, home devices may be classified into information device such as personal computers, facsimiles, scanners, and printers, A/V devices such TV sets, set top boxes, DVD players, VCRs, audios, camcorders, and home game machines, control device such as coffee makers, electric rice cookers, refrigerators, washing machines, microwave ovens, and digital cameras, and dummy devices such as remote controllers, interphones, sensors, and lamps.

In the home network the various devices are connected to each other through USB, IEEE1394, phone lines, power lines, a wireless LAN, or Bluetooth. The devices in the home network constitute a plurality of sub networks. The device may operate on different hardware and software platforms. Therefore, in general, it is not easy to construct the home network.

Accordingly, as a method of constructing the home network, there has been proposed a scheme of constructing a virtual computing environment, that is, called middleware, common to the distributed devices and providing applications thereon.

The middleware is a kind of software for device communication between different types of devices in the home network.

In addition, the middleware is located between an operating system and application programs in order to clearly connect distributed applications and distributed data in a service client service server environment.

In other words, the middleware is a kind of software for implementing independent connection to hardware according to kinds of networks in order to supports various types of communication protocols, system structures, OSs, database, and application programs. As currently proposed middleware schemes for the home network, there are UPnP (Universal Plug and Play), HAVi (Home AV Interoperability), JINI, Home Wide Web, and the like.

Among them, although the HAVi utilizes separate protocol stacks designed based on IEEE1394, the HAVi is not sufficient for the internetworking. The UPnP and the JINI are used in layers under the TCP/IP protocol in order to implement the internetworking. The UPnP and the JINI are mainly used for the internetworking between the PCs and the PC peripherals. However, the UPnP and the JINI are not sufficient for real time data transmission (audio/video data transmission) between the digital electronic appliances.

As one of the middleware techniques, there is proposed the UPnP in the UPnP forum. The UPnP forum, founded on Oct.18, 1999, is a community of about 200 companies of electronic appliances, computers, home automation, mobile devices, or the like. The UPnP forum defines and discloses standard recommendations for devices and services based on an Internet-based communication standard. The object of the UPnP forum is to easily construct the network for the devices in home or office and control the devices.

Currently, methods of controlling and managing devices of an in-home network by using the UPnP technique have proposed. In the control management system, the user interfaces, UPnP application program interfaces (hereinafter, referred to as API), and control points exist on a single system. Therefore, when the user executes a control command by using the user interface and the UPnP API in order to control a device, the control point actually controls the devices.

On the other hand, if an addition network administrator is not provided to the aforementioned home network, it is difficult for general users having less network knowledge to construct the network. Therefore, there is a need for a home network which can be easily constructed by the general users. In particular, techniques for controlling the client at the same time that the client is connected to the host are required.

In addition, web synchronization and PC synchronization techniques have been used in order to perform information processing and secure copyrights in multimedia devices such as mobile phones and MP3 players. In the techniques, the device driver, the control S/W, and application S/W are provided through separate storage media for example, CDs.

In this case, customers must connect the device to a PC or a host system and, after that, install device drivers, the control S/W, and application S/W. Next, a device deriver and control SW of the client, for example, a mobile phone or an MP3 player must be installed and set up.

In implementation of the PC synchronization of the client, there are problems of setup complexity and procedure difficulty. Although the aforementioned plug-and-play techniques may somewhat solve the problems, there is still a need for separate storage media for installing the device driver and the control S/W in the host. In implantation of the web synchronization, there is a problem in that separate software must be installed to connect the web in addition to the aforementioned steps.

In order for the host to control the client through the communication compatible operation between the host and the client, the following steps and requirements must be satisfied.

(1) Physical communication interfaces for connection between the host and the client must be equal. For example, if the host is a USB plug type, the client must also be a USB plug type.

(2) Electrical communication signal systems of the host and the client must be basically equal.

(3) Logical communication data protocols of the host and the client must be equal.

(4) In order to the host to control the client, the device driver installed in the host must be compatible to the control protocol of the client.

(5) Command protocol of the client control S/W installed in the host must be equal to a client command protocol or a client device driver installed in the host.

(6) When a client based service is received from the host, a service software control and service protocol must be equal to a communication and control protocol of the client.

Conventionally, it is inconvenient for the user to directly install the protocol, the device driver, the control software, the service software for the client in the host in order to maintain compatibilities of the requirements (2) to (6) excluding the requirement (1).

Hereinafter, in the present invention, the protocols and the device drivers are collectively referred to as a device driver.

SUMMARY OF THE INVENTION

The present invention provides a host client plug-and-play system and method capable of easily controlling a client by automatically installing and executing control software and application software of controlling the client in the host at the same time that the client is connected to the host.

The present invention also provides a host client plug-and-play system and method capable of easily controlling a client by transmitting control software and application software of controlling the client stored in a memory of the client to a host and automatically installing and executing the control software and the application software in the host at the same time that the client is connected to the host.

The present invention also provides a host client plug-and-play system and method capable of easily controlling a client by performing communication by using a virtual device driver at a first connection between a host and the client and installing an original device driver in the host through the communication.

According to an aspect of the present invention, there is provided a host client plug-and-play system in a host client communication system where at least one client is controlled by at least one host, comprising: a host which automatically installs a device driver and control software for identifying and controlling a client to control the client when the client is connected to the host through communication means; and a client which is connected to the host through the communication means and controlled with the control software installed in the host.

In the above aspect of the invention, the host client plug-and-play system may further comprise a device server which is connected to the host through a wired/wireless network and provides to the host the device driver and control software for allowing the host to identify and control the client.

In addition, the host client plug-and-play system may further comprise a service server which is connected to the host through a wired/wireless network and provides client based service software and service to the host.

According to another aspect of the present invention, there is provided a host client plug-and-play method in a host client communication system where at least one client is controlled by at least one host, comprising: (a) a step of performing device connection between the client and the host; (b) a step of performing communication compatible operation step between the client and the host; (c) a step where the host receives a device driver and control software for allowing the host to identify and control the client; (d) a step where the host installs the received device driver and control software; (e) a step of performing device identification and communication compatible operation between the host and the client by using the device deriver installed in the host; and (f) a step where the host controls the client by using the control software installed in the host.

In the above aspect of the invention, the host client play-and-play method may further comprise, after the step (e): a step where the host connects the service server to transmit client terminal information; a step where the service server searches supportable client based service software from the client terminal information; and a step where the host receives the client based service software from the service server and install the client based service software.

In addition, the step (b) may comprise: a step where the client loads a virtual device driver of the memory on a controller and executes the virtual device driver; a step where the client executes a virtual device response process to transmit a client connection response signal to the host; a step where the host analyses the received client connection response signal to search a standard device driver; a step where the host loads the searched standard device driver on a memory; and a step where the host identifies the client and performs communication compatible operation by using the standard device driver.

In addition, the step (b) may comprise: a step where the client executes a standard device driver; a step where the client executes a standard device response process to transmit a client connection response signal to the host; a step where the host analyzes the received client connection response signal to search the standard device driver; a step where the host loads the searched standard device driver on a memory; and a step where the host identifies the client and performs communication compatible operation by using the standard device driver.

In addition, the step (c) may comprise a step where the client transmits the device driver and control software stored in the memory to the host.

In addition, the step (c) may comprise: a step where the client transmits an installation agent to the host; a step where the host executes the transmitted installation agent to transmit a list of the device drivers and control software which are to be installed in the host to the client; and a step where the client transmits the device drivers and control software requested by the installation agent to the host.

In addition, the step (c) may comprise: a step where the client transmits position information of the device driver and control software to the host; a step where the host requests the device server for the device driver and control software; a step where the device serve transmits the requested device driver and control software to the host.

In addition, the step (c) may comprise: a step where the client transmits an installation agent to the host; a step where the host executes the transmitted installation agent to transmit a list of the device drivers and control software which are to be installed in the host to the device server; and a step where the device server transmits the requested device drivers and control software to the host.

In addition, the step (c) comprise: a step where the clients connects the device server to receive the device driver and control software; a step where the client transmits the received device driver and control software to the host.

In addition, the step (c) may comprise: a step where the client connects the device server to request the device server to transmit the device driver and control software to the host; and a step where the device server transmits the device driver and control software to the host.

In addition, the step (e) may comprise: a step where the host transmits device driver install completion information to the client; a step where the client executes the device driver; a step where the client transmits execution information of the device driver to the host and ends executing of a virtual device driver or a standard device driver; a step of performing device identification and connection between the host and the client by using the device driver; and a step where the host loads the device driver on a memory and executes the control software.

In addition, the host client play-and-play method may further comprise, before the step (c), an authentication step for transmitting the device driver and control software.

In addition, the authentication step may comprise: a step where the host receives authentication information; a step where the host transmits the transmitted authentication information to an authentication server; a step where the authentication server verifies the transmitted authentication information; a step where authentication success information is transmitted to the host where the authentication succeeds as a verification result; a step where the host analyzes the authentication success information to inform data transmission permission; a step where authentication failure information is transmitted to the host where the authentication does not succeed as a verification result; and a step where the host analyzes the authentication failure information to inform data transmission prohibition.

In addition, the host client play-and-play method may further comprise, before the step (d), an authentication step for installing the device driver and control software.

In addition, the authentication step may comprise: a step where the host transmits terminal information and installation file information to an authentication server; a step where the authentication server determines where not the terminal information and the installation file information are equal to each other; a step where authentication success information is transmitted to the host when a file is a normally authenticated file as a determination result; a step where the host analyzes transmitted authentication success information to install the file; a step where authentication failure information is transmitted to the host when a file is not a normally authenticated file as a determination result; a step where the host stop installing the file due to the authentication failure.

According to still another aspect of the present invention, there is provided a host client plug-and-play method in a host client communication system where at least one client is controlled by at least one host, comprising: (a) a step of performing device connection between the client and the host; (b) a step of performing communication compatible operation step between the client and the host by using a translation process; (c) a step where the host receives control software for allowing the host to control the client and installs the control software; (d) a step where the host performs device identification and communication compatible operation between the host and the client by using a standard device driver; and (e) a step where the host controls the client by using the control software installed in the host.

In the above aspect of the invention, the step (b) may comprise: a step where the client executes the standard device driver and the translation process; a step where the client executes a standard device response process to transmit a client connection response signal to the host; a step where the host analyzes the received the client connection response signal to search the standard device driver; a step where the host loads the searched standard device driver on a memory; and a step where the host identifies the client and performs communication compatible operation by using the standard device driver.

In addition, the communication compatible operation step may comprise: a step where the host transmits a control command to the client by using the standard device driver; a step of the client translates the transmitted control command into a form which the client can recognize by using the translation process; and a step where the client executes the translated control command.

BRIEF DESCRIPTION OF THE DRAWINGS

The above and other features and advantages of the present invention will become more apparent by describing in detail exemplary embodiments thereof with reference to the attached drawings in which.

BEST MODE FOR CARRYING OUT THE INVENTION

Now, preferred embodiments of the present invention will be described in detail with reference to the accompanying drawings. In the description, well-known constructions or components which may not clarify the construction of the present invention will be omitted.

In the present invention, a method of allowing a host to control a client at the same time that the client is connected to the host is provided. In order to achieve the object, when the client is connected to the host, a device driver and control software (hereinafter, referred to as "control S/W") capable of identifying and controlling the client is automatically installed, and the installed control S/W is executed, so that the client is controlled. In addition, in the following description, 'plug-and-play' implemented in the present invention includes "plug-and-service".

The method of installing the device driver and control S/W in the host may be implemented in various manners according to the embodiments of the present invention. As an example, the device driver and control software is stored in a memory of the client, and at the same time that the client is connected to the host, the device driver and control S/W stored in the client is transmitted to the host in order to install the device driver and control S/W in the host. As another example, after the device driver and control S/W is installed, the host receives client associated service S/W from a service server in order to the device driver and control S/W in the host.

As still another example, at the same time that the client is connected to the host, position information of the device driver and control S/W is transmitted to the host, so that the host receives the device driver and control S/W through the device server in order to the device driver and control S/W in the host.

As further still another example, after the client is connected to the host, the client receives the device driver and control S/W from the device server and transmits the device driver and control S/W to the host in order to the device driver and control S/W in the host.

As further still another example, after the client is connected to the host, the client requests the device server to transmit the device driver and control S/W, and the device server transmits the device driver and control S/W to the host in order to the device driver and control S/W in the host.

Firstly, constructions of plug-and-play system and device according to the present invention will be described with reference to FIGS. 1 and 2.

Figure 1:
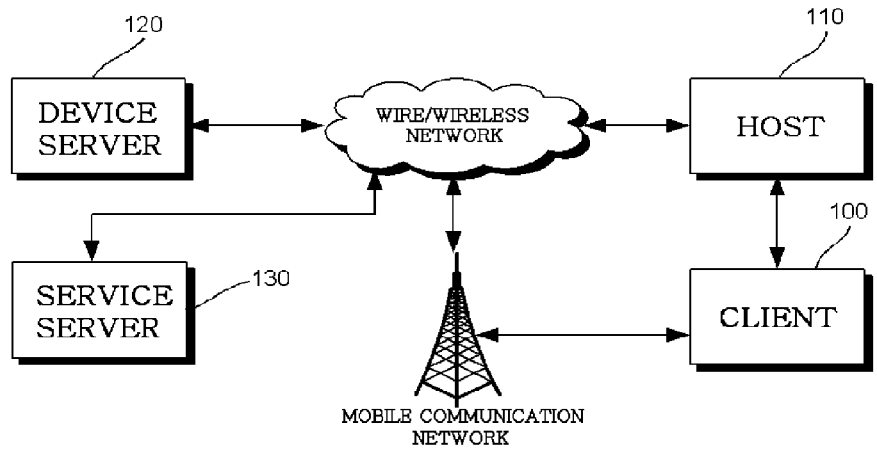
FIG. 1 is a view showing a plug-and-play system according to the present invention.

FIG. 1 is a view showing the plug-and-play system according to an embodiment of the present invention.

Referring to FIG. 1, the plug-and-play system according to the present invention includes a client 100, a host 110, a device server 120, and a service server 130.

The host 110 can be connected through a wired/wireless network to the device server 120 and/or the service server 130. In addition, the host 110 can be connected through wired/wireless communication means to the at least one client 100. According to the present invention, the host 110 can automatically identify and control the client 100 without any addition installation procedure of device drivers and control S/W by a user at the time that the host 110 is connected to the client 100.

On the other hand, the host 110 may be various digital devices having wired/wireless communication means such as a home server and a PC. In addition, as described above, the host 110 can be connected to the at least one client 100 through wired/wireless general-purpose communication means. The general-purpose wired/wireless communication means may be any of Infrared Data Association (IrDA), universal serial bus (USB), IEEE 1394,RS232,RS422, RS485, Bluetooth, and the like.

In addition, the client 100 may be a PDA, a smart phone, an MP3 player, a digital camera, or various electronic home appliances having the communication means.

On the other hand, the client 100 may directly communicate through mobile communication network with the service server 130 or the device server 120.

The device server 120 transmits a device driver and control S/W for identifying and controlling the client 100 through the wired/wireless network to the host 110 or the client 100.

In response to a request for the host 110, the service server 130 transmits client based service software (hereinafter, referred as "service S/W") to the host 110.

On the other hand, although not shown in FIG. 1, the plug-and-play system according to the present invention may further include an authentication server which is connected to the host 110 through the wired/wireless network.

The authentication server authenticates transmission of files of the device driver or the control S/W transmitted to the host 110. In addition, before the installation of the files, the authentication server authenticates to-be-installed files. On the other hand, the authentication server, as described above, may a third party organization or an "authentication unit" as a component of the device server 120 or the service server 130.

Figure 2:
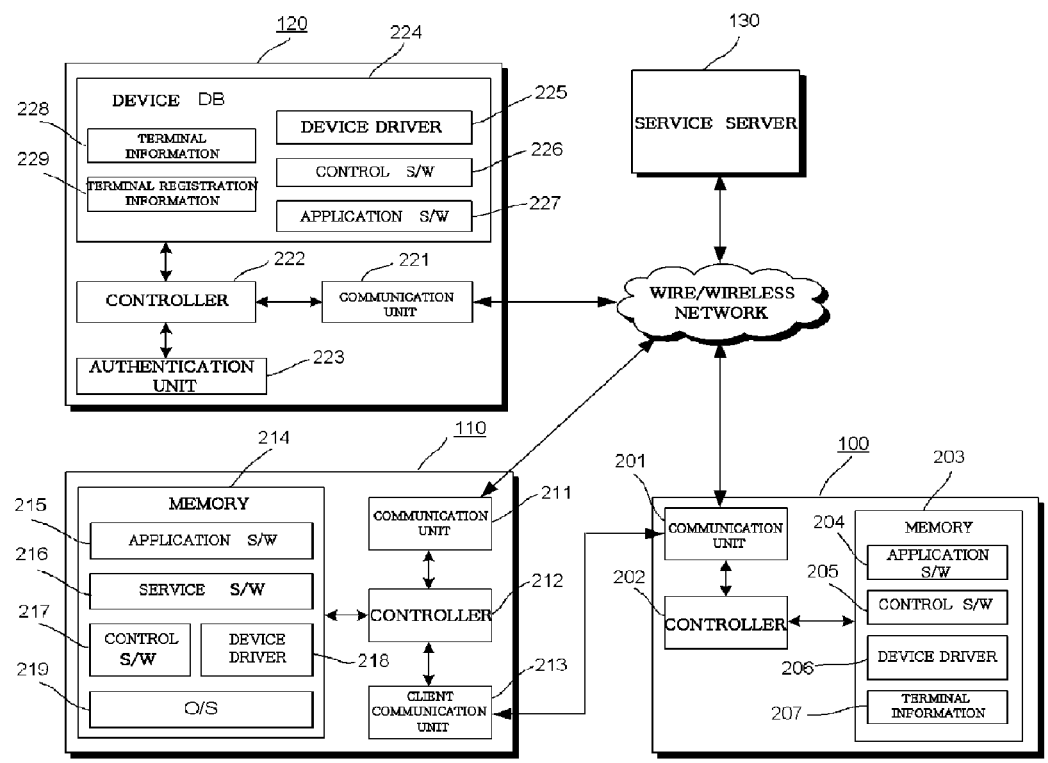
FIG. 2 is a block diagram showing a plug-and-play system according to preferred embodiments of the present invention.

FIG. 2 is a detailed view showing a construction of a plug-and-play system according to preferred embodiments of the present invention.

Referring to FIG. 2, the device server 120 may include a communication unit 221, a controller 222, an authentication unit 223, and a device database (hereinafter, referred to as "device D/B") 224.

The communication unit 221 communicates through the wired/wireless network with the host 110 and the client 100. The controller 222 transmits to the host 110 and the client 100 the files of the device driver and control S/W (hereinafter, referred to as "control S/W or the like") and controls the host 110 and the client 100.

The authentication unit 223 authenticates transmission and installation of the control S/W or the like which is to be transmitted and installed to the host 110. As described above, the authentication unit 223 may be a component of the service server 130 or a third party organization which is physically independent of the authentication server.

The device D/B 224 stores information such as information on the device driver 225, the control S/W 226, and the application S/W 227, and terminal information 228, terminal registration information 229, and the like.

The terminal information 228 may include a serial number, terminal history information, terminal trouble information, and terminal owner information of a client terminal, and various kinds of information associated with the client terminal. The information on the device driver 225 may include information of device drivers used to the clients 100 and the host 110 according to the type, use, and version thereof. The information on the control software 226 may include information of control software used to the clients 100 and the host 110 according to the type, use, and version thereof. In addition, the terminal registration information 229 may include history information and generation information which are common to a type of terminals, error information, or the like.

The host 110 may include a communication unit 211, a controller 212, a client communication unit 213, a memory 214, and the like.

The controller 212 controls all the functions of the host 110, and the communication unit 211 has a function of enabling the host 110 to be connected through wired/wireless network to the device server 120 or the service server 130.

The client communication unit 213 has a function of enabling the host 110 to communicate with the client 100. The memory 214 includes application S/W 215, service S/W 216, control S/W 217, a device driver 218, an operating system (O/S) 219, and the like.

The client 100 may include a communication unit 201, a controller 202, a memory 203, and the like.

The communication unit 201 has a function of enabling the client 100 to communicate with the device server 120 or the host 110, and the controller 202 controls all the functions of the client 100.

The memory 203 includes application S/W 204, control S/W 205, a device driver 206, terminal information 207, and the like, and preferably, is conducted with a non-volatile memory.

The device drivers 206 and 218 are installed in the host 110 to enable the host 110 to identify and communicate with the client 100. The control S/W 205 and 217 are installed in the host 110 to enable the host 110 to control the client 100. The application S/W 204 and 215 and the service S/W 216 are installed in the host 110 to provide a client based service.

On the other hand, in order to control the client 100 according to the present invention, the control S/W or the like which is installed in the client 110 to enable the host 110 to control the client 100 may be transmitted from the client to the host 110 or from the device server 120 to the host 120 at the time of connection between the host 110 and the client 100.

Now, a plug-and-play method between a host and a client according to embodiments of the present invention will be described with reference to FIGS. 3 to 16. According to the embodiments of the present invention, as described above, after communication compatible operation between the host 110 and the client 100 are established by device connection therebetween, the host 110 receives the control S/W or the like for controlling the client 100 from the client 100 or the device server 120 and installs the control S/W or the like, so that the host 110 can control the client 100.

Firstly, plug-and-play procedures according to the embodiments of the present invention will be described with reference to FIGS. 3 to 7.

Figure 3:
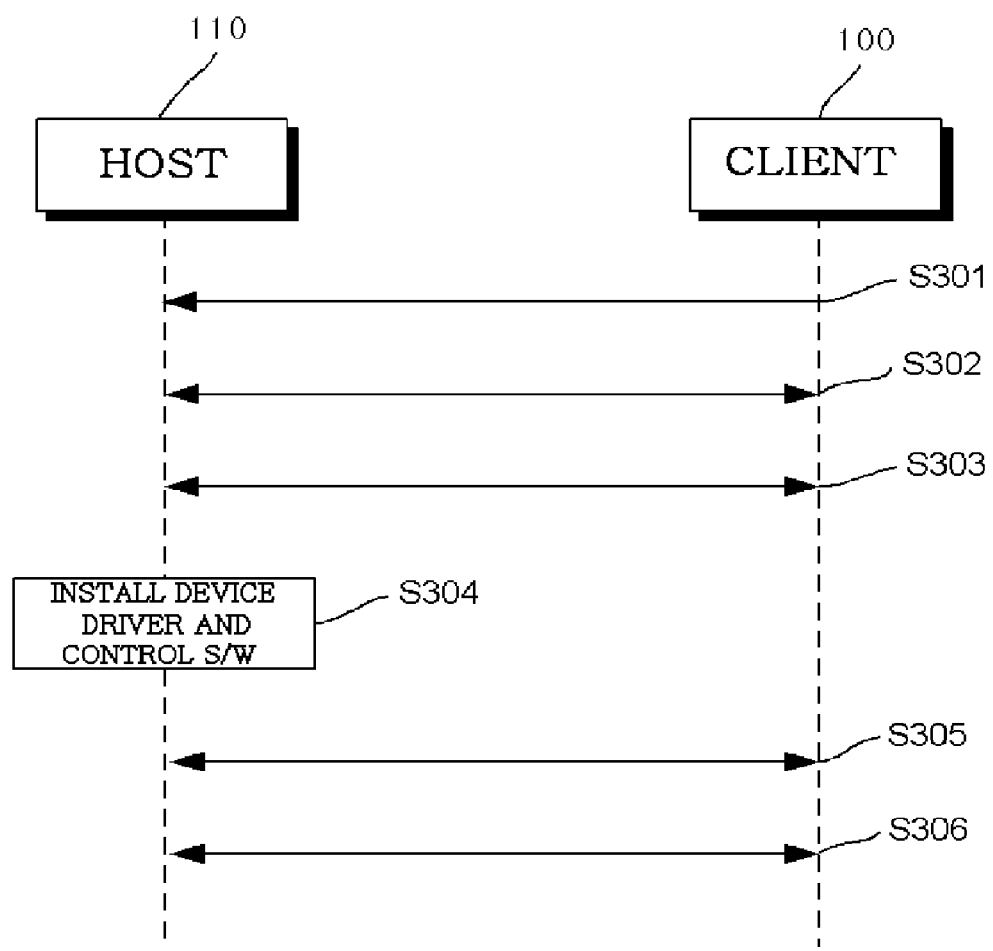
FIG. 3 is a signal flowchart showing a plug-and-play procedure according to a first embodiment of the present invention.

FIG. 3 is a signal flowchart showing a plug-and-play procedure according to a first embodiment of the present invention.

Referring to FIG. 3, the host 110 receives the control S/W or the like from the client 100 and install the control S/W or the like, so that the host 110 can control the client 100.

More specifically, firstly, when device connection between the host 110 and the client 100 is established (S301), a communication compatible operation procedure between the host 110 and the client 100 is performed (S302). Next, the device driver and the control S/W of identifying and controlling the client 100 are transmitted from the client 100 to the host 110 (S303), and the host 110 installs the transmitted device driver and control S/W (S304).

The host 110 identifies the client 100 by using the device driver installed in the host 110, and the communication compatible operation therebetween is established (S305). Finally, the host 110 controls the client 100 by using the control S/W installed in the host 110 (S306).

The details of the steps will be described later with reference to FIGS. 8 to 19.

Figure 4:
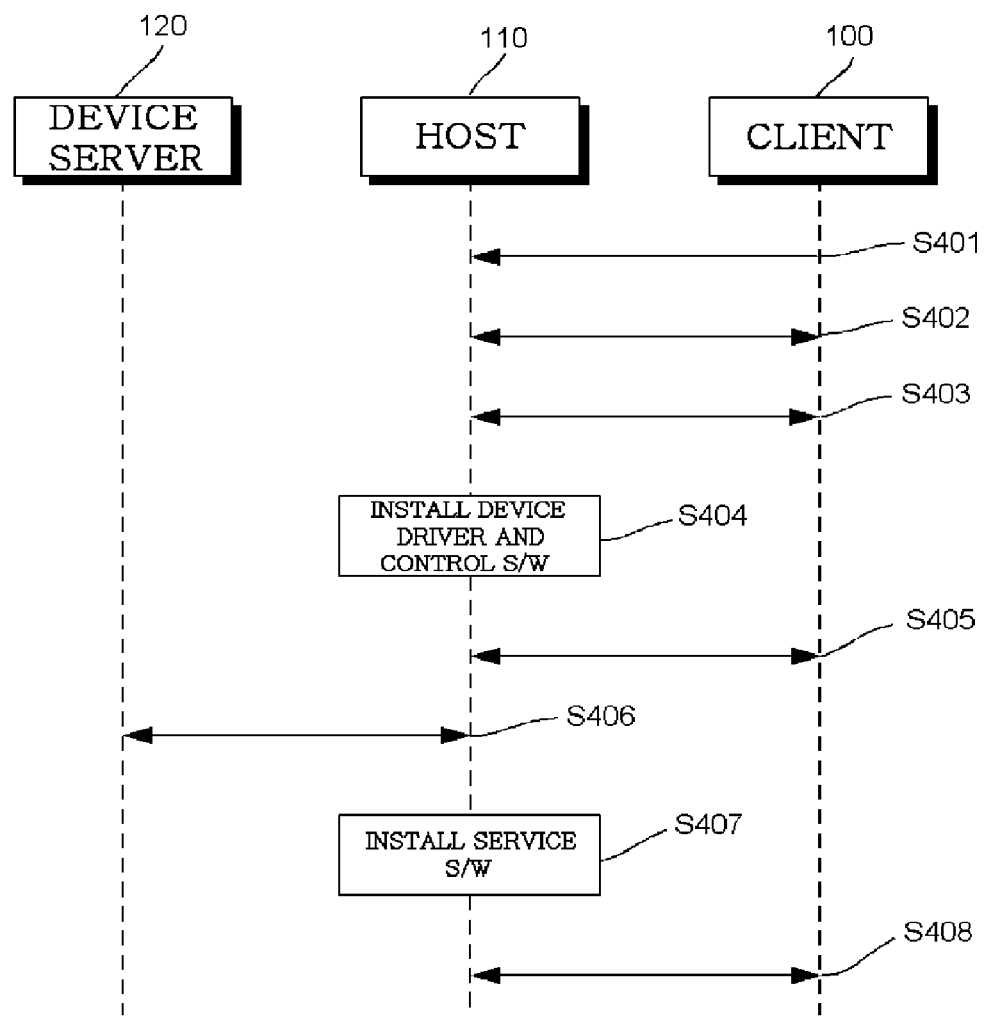
FIG. 4 is a signal flowchart showing a plug-and-play procedure according to a second embodiment of the present invention.

FIG. 4 is a signal flowchart showing a plug-and-play procedure according to a second embodiment of the present invention.

Referring to FIG. 4, after the host 110 receives the control S/W or the like from the client 100 and install the control S/W or the like, the host 110 receives the client based server S/W or the like from the service server 130 and installs the client based service S/W or the like, so that the host 110 can control the client 100.

More specifically, firstly, when device connection between the host 110 and the client 100 is established (S401), a communication compatible operation procedure between the host 110 and the client 100 is performed (S402) Next, the device driver and the control S/W are transmitted from the client 100 to the host 110 (S403), and the host 110 installs the transmitted device driver and control S/W (S404).

The host 110 identifies the client 100 by using the device driver installed in the host 110, and the communication compatible operation therebetween is established (S405).

Next, the host 110 receives the client based service S/W or the like from the service server 130 and installs the client based service S/W (S406), and the host 110 controls the client 100 by using the installed control S/W and service S/W (S407).

The details of the steps will be described later with reference to FIGS. 8 to 19.

Figure 5:
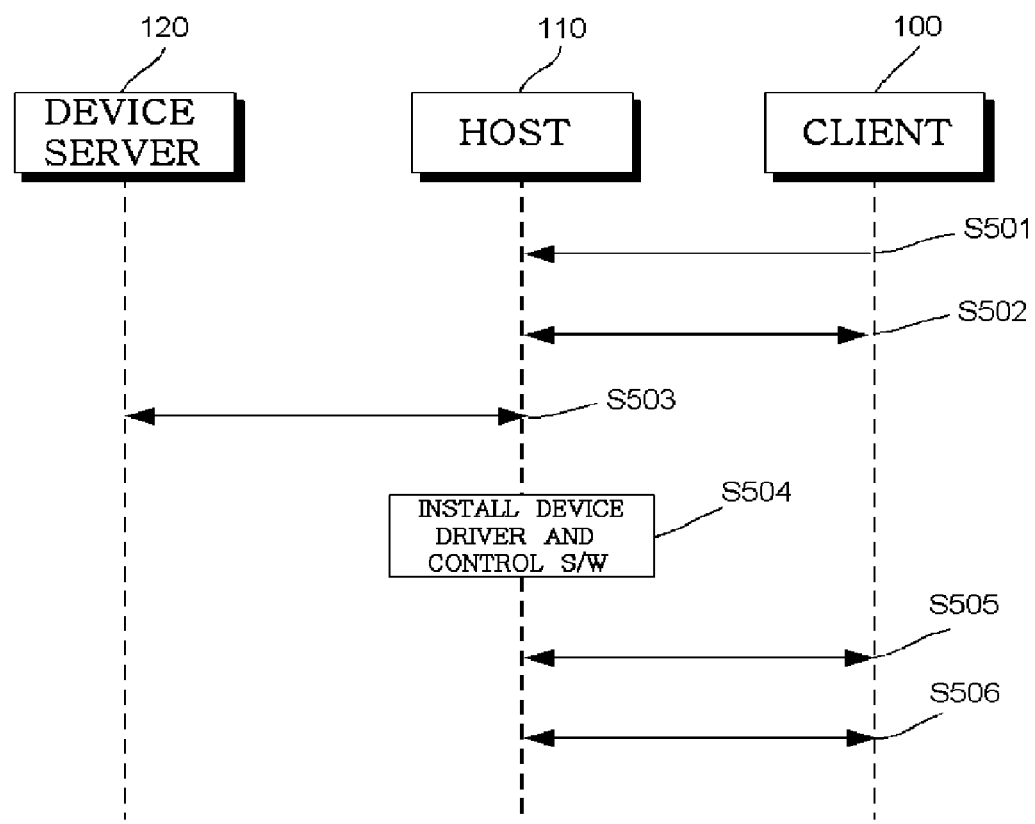
FIG. 5 is a signal flowchart showing a plug-and-play procedure according to a third embodiment of the present invention.

FIG. 5 is a signal flowchart showing a plug-and-play procedure according to a third embodiment of the present invention.

Referring to FIG. 5, after device connection between the host 110 and the client 100 is established, the host 110 receives the control S/W or the like from the device server 120 and install the control S/W or the like, the host 110 can control the client 100.

More specifically, firstly, when the device connection between the host 110 and the client 100 is established (S501), a communication compatible operation procedure between the host 110 and the client 100 is performed (502). Next, the host 110 receives the control S/W or the like from the device server 120 and installs the control S/W or the like (S503), so that the host 110 identifies the client 100 by using the device driver installed in the host 110, and the communication compatible operation therebetween is established (S505). Finally, the host 110 controls the client 100 by using the control S/W installed in the host 110 (S506).

The details of the steps will be described later with reference to FIGS. 8 to 19.

Figure 6:
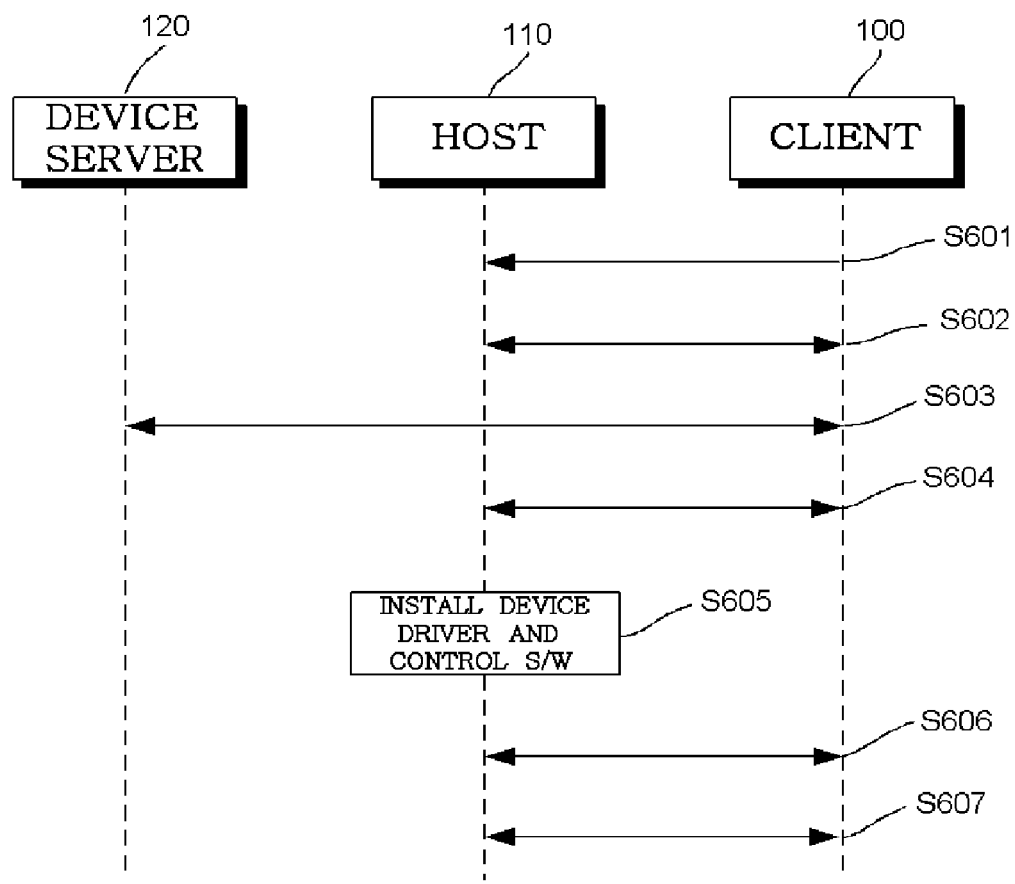
FIG. 6 is a signal flowchart showing a plug-and-play procedure according to a fourth embodiment of the present invention.

FIG. 6 is a signal flowchart showing a plug-and-play procedure according to a fourth embodiment of the present invention.

Referring to FIG. 6, after device connection between the host 110 and the client 100 is established, the client 100 receives the control S/W or the like from the device server 120 and transmits the control S/W or the like to the host 110, and the host 110 installs the transmitted control S/W or the like, so that the host 110 can control the client 100.

More specifically, firstly, when the device connection between the host 110 and the client 100 is established (S501), a communication compatible operation procedure between the host 110 and the client 100 is performed (S602). Next, the client 100 receives the control S/W or the like from the device server 120 (S603) and transmits the control S/W or the like to the host 110 (S604).

The host 110 installs the transmitted control S/W or the like (S605) and identifies the client 100 by using the device driver installed the host 110, so that the communication compatible operation therebetween is established (S606). Finally, the host 110 controls the client 100 by using the control S/W installed in the host 110 (S607).

The details of the steps will be described later with reference to FIGS. 8 to 19.

Figure 7:
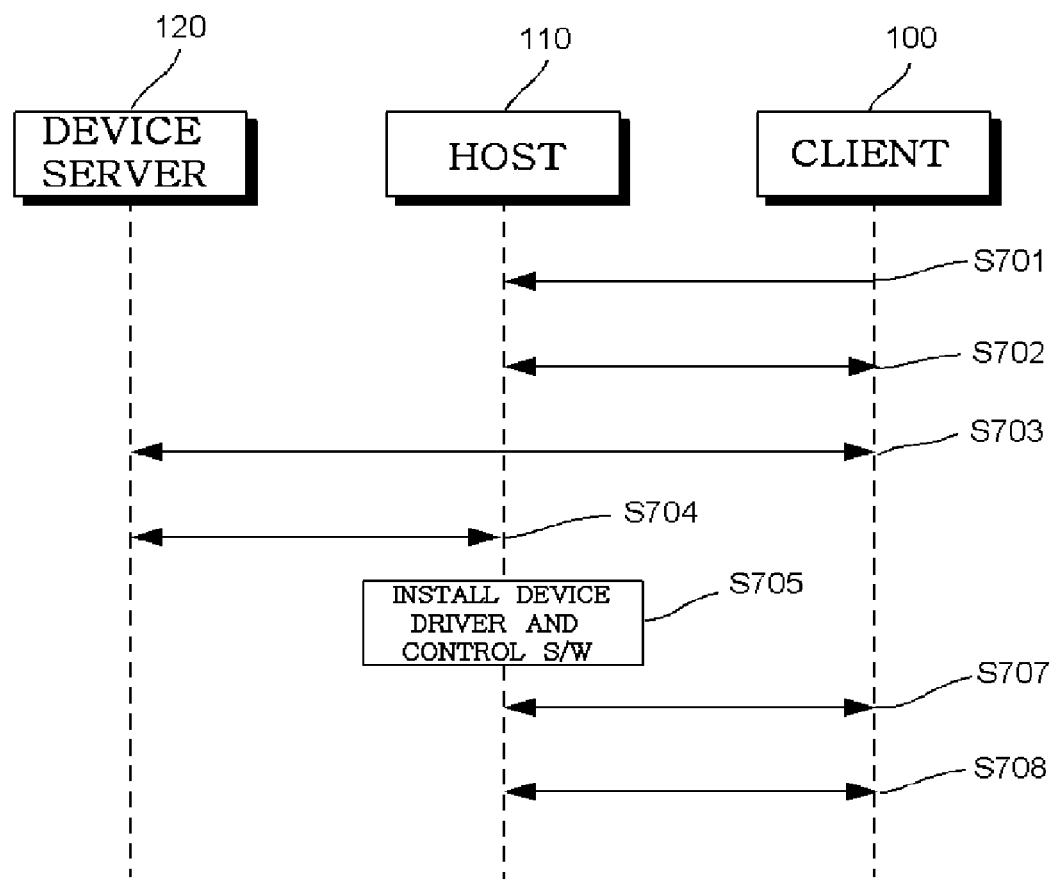
FIG. 7 is a signal flowchart showing a plug-and-play procedure according to a fifth embodiment of the present invention.

FIG. 7 is a signal flowchart showing a plug-and-play procedure according to a fifth embodiment of the present invention.

Referring to FIG. 7, after device connection between the host 110 and the client 100 is established, the client 100 request the device server 120 to transmit the control S/W or the like, and in response to the request, the device server 120 has access to the host 110 and transmits the control S/W or the like. The host 110 installs the transmitted control S/W or the like, so that the host 110 controls the client 100.

More specifically, firstly, when the device connection between the host 110 and the client 100 is established (S701), a communication compatible operation procedure between the host 110 and the client 100 is performed (S702). Next, the client 100 requests the device server 120 to transmit the control S/W or the like (S703), and in response to the request, the device server 120 has access to the host 110 and transmit the control S/W or the like to the host 110 (S704).

The host 110 installs the transmitted control S/W or the like (S705), so that the host 110 identifies the client 100 by using the device driver, and the communication compatible operation therebetween is established (S706). Finally, the host 110 controls the client 100 by using the control S/W installed in the host 110 (S707).

The details of the steps will be described later with reference to FIGS. 8 to 19.

On the other hand, the aforementioned embodiments, a transmission authentication step may further be included before the control S/W or the like is transmitted from the client 100, the device server 120, or the service server 130 to the host 110. In addition, an installation authentication step may further be included before the transmitted control S/W or the like is installed in the host 110.

In the later description, some steps may be commonly employed in the first to fifth embodiments, and other steps may be limited to some embodiments.

Now, detailed procedures of the aforementioned steps shown in FIGS. 3 to 7 according to the first to fifth embodiments of the present invention will described with reference to FIGS. 8 to 19.

Firstly, the communication compatible operation procedure between the host 110 and the client 100 according to the first to fifth embodiments of the present invention will be described in detail in detail with reference to FIGS. 8 to 10.

Figure 8:
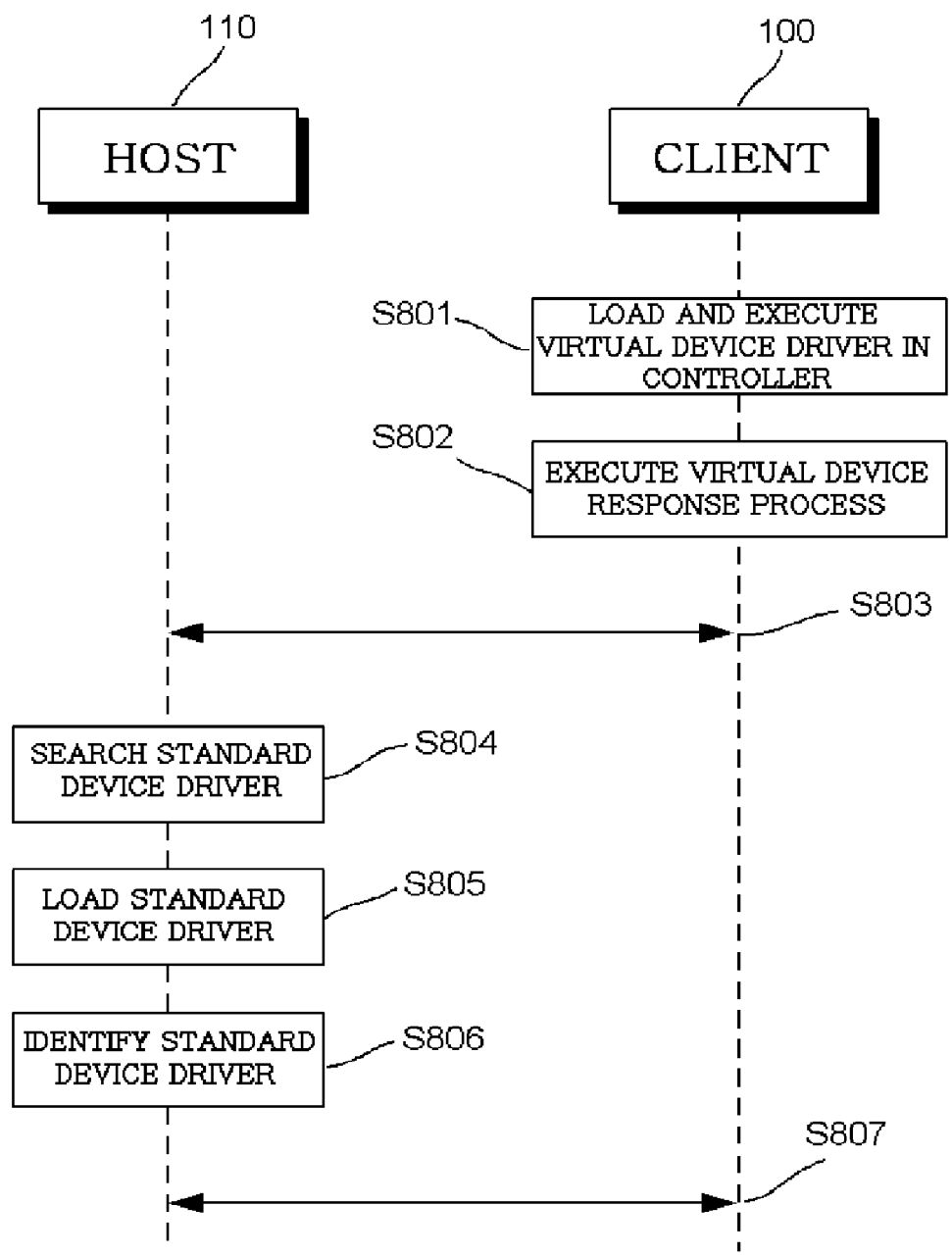
FIG. 8 is a signal flowchart showing a communication compatible operation procedure by a virtual device driver according to the first to fifth embodiments of the present invention.

FIG. 8 is a detailed signal flowchart showing the communication compatible operation procedure between the host 110 and the client 100 by a virtual device driver according to the first to fifth embodiments of the present invention.

In the communication compatible operation procedure between the host 110 and the client 100 by the virtual device driver, the client 100 executes the virtual device driver, so that the client 100 operates like a standard device which is basically installed in the host 110 to implement the communication between the host 110 and the client 100. The details of the procedure are as follows.

Referring to FIG. 8, firstly, in the client 100, a virtual device driver of the memory is loaded on the controller 212 and executed (S801). Next, the client 100 executes a virtual device response process (S802) and transmits a client connection response signal according to a virtual device process to the host 110 (S803).

The host 110 analyzes the transmitted response signal and searches a standard device driver (S804). By loading the standard device driver on the memory (S805) to identify the client 100 as a standard device (S806), the communication between the host 110 and the client 100 is established (S807).

Figure 9:
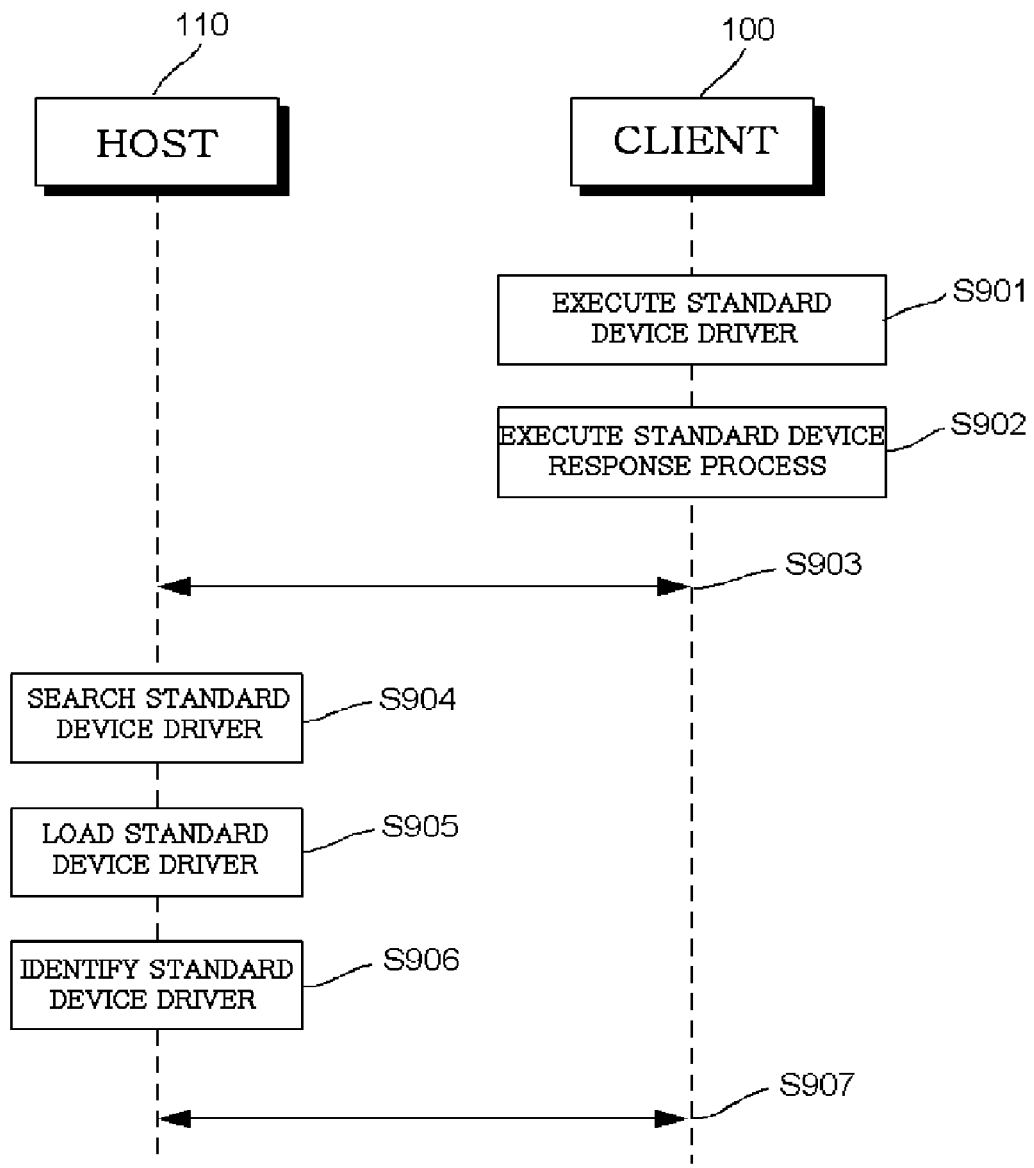
FIG. 9 is a signal flowchart showing a communication compatible operation procedure by a standard device driver according to the first to fifth embodiments of the present invention.

FIG. 9 is a detailed signal flowchart showing the communication compatible operation procedure between the host 110 and the client 100 by a standard device driver according to the first to fifth embodiments of the present invention.

In the communication compatible operation procedure between the host 110 and the client 100 by the standard device driver, the client 100 executes the standard device driver supported by the host 110, so that communication between the host 110 and the client 100 is implemented. The details of the procedure are as follows.

Referring to FIG. 9, firstly, in the client 100, a standard device driver of the memory is loaded on the controller 212 and executed (S901). Next, the client 100 executes a standard device response process (S902) and transmits a client connection response signal to the host 110 (S903).

The host 110 analyzes the transmitted response signal and searches the standard device driver (S904). By loading the standard device driver on the memory (S905) to identify the client 100 as a standard device (S906), the communication between the host 110 and the client 100 is established (S907).

Figure 10:
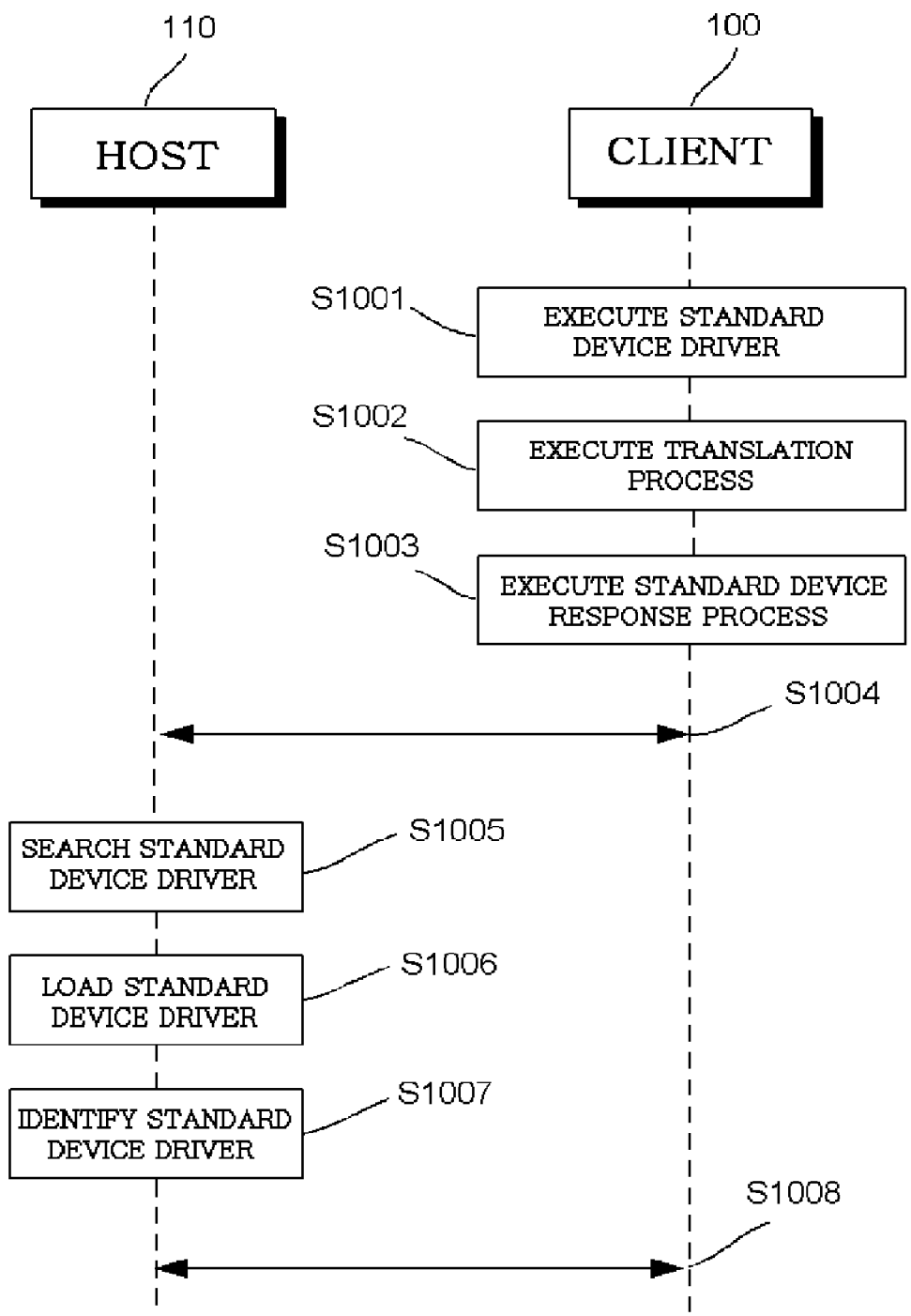
FIG. 10 is a signal flowchart showing a communication compatible operation procedure by a translator according to the first to fifth embodiments of the present invention.

FIG. 10 is a detailed signal flowchart showing the communication compatible operation procedure between the host 110 and the client 100 by a translator according to the first to fifth embodiments of the present invention.

Referring to FIG. 10, firstly, in the client 100, a standard device driver of the memory is loaded on the controller 212 and executed (S1001). Next, after the client 100 executes a translation process (S1002), the client 100 executes a standard device response process (S1003) and transmits a client connection response signal to the host 110 (S1004).

The host 110 analyzes the transmitted response signal and searches a standard device driver (S1005). By loading the standard device driver on the memory (S1006) to identify the client 100 as a standard device (S1007), the communication between the host 110 and the client 100 is established (S1008).

The procedure following the communication compatible operation is as follows. When the host 110 transmits a control command to the client 100 by using the standard device driver, the client 100 translates the transmitted control command into a form which the client 100 can recognize by using the translation process, and after that, the client 100 executes the translated control command.

Figure 11:
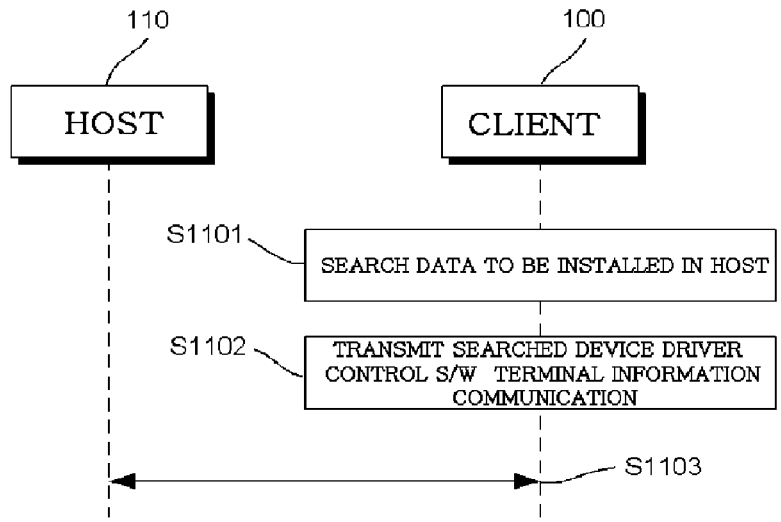
FIGS. 11 and 12 are signal flowcharts showing a device driver and control S/W transmission procedure according to the first and second embodiments of the present invention.
Figure 12:
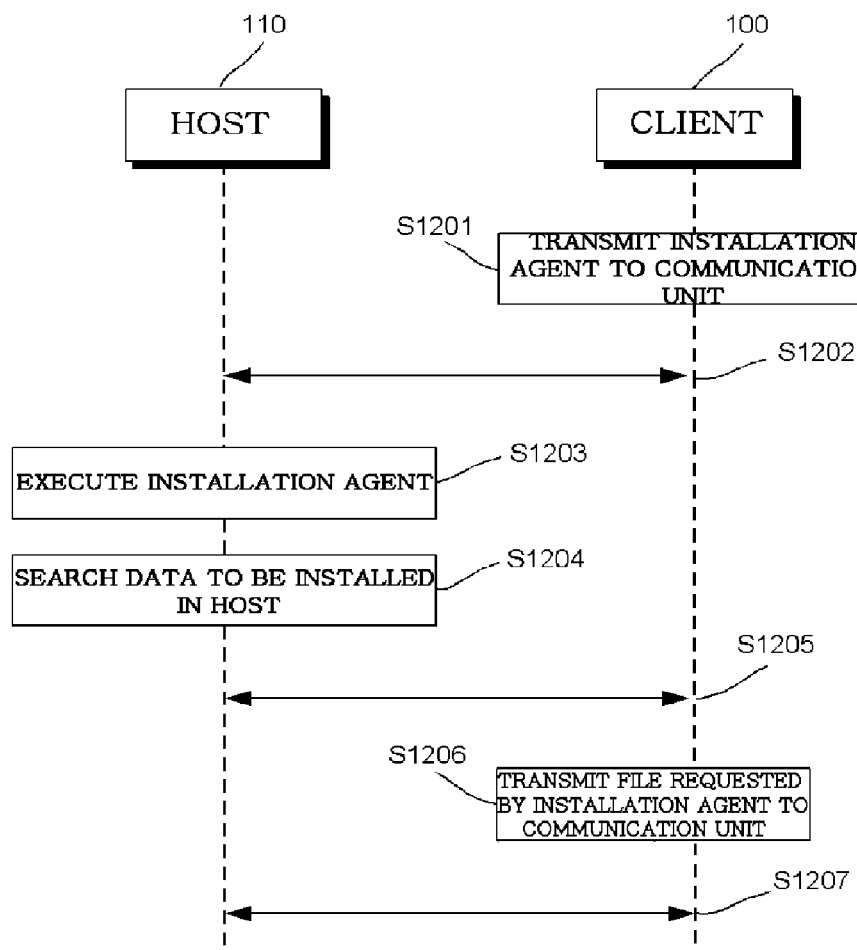

FIGS. 11 and 12 are detailed signal flowcharts showing a control S/W transmission procedure according to the first and second embodiments of the present invention.

Referring to FIG. 11, firstly, the client 100 searches data which are to be installed in the host 110 (S1101). Next, the client 100 transmits the terminal information and the control S/W or the like stored in the memory through the communication unit to the host 110 (S1102 and S1103).

FIG. 12 is a signal flowchart showing a control S/W transmission procedure using an installation agent.

Referring to FIG. 12, firstly, the client 100 transmits the installation agent of the memory through the communication unit to the host 110 (S1201 and S1202). The host 110 executes the transmitted installation agent (S1203), searches files which are to be installed in the host 110 (S1204), and transmits to the client 100 a file list of the files which are to be installed in the host 110 (S1205).

The client 100 transmits the terminal information and data of the control S/W or the like requested by the installation agent through the communication unit to the host 110 (S1206 and S1207).

Figure 13:
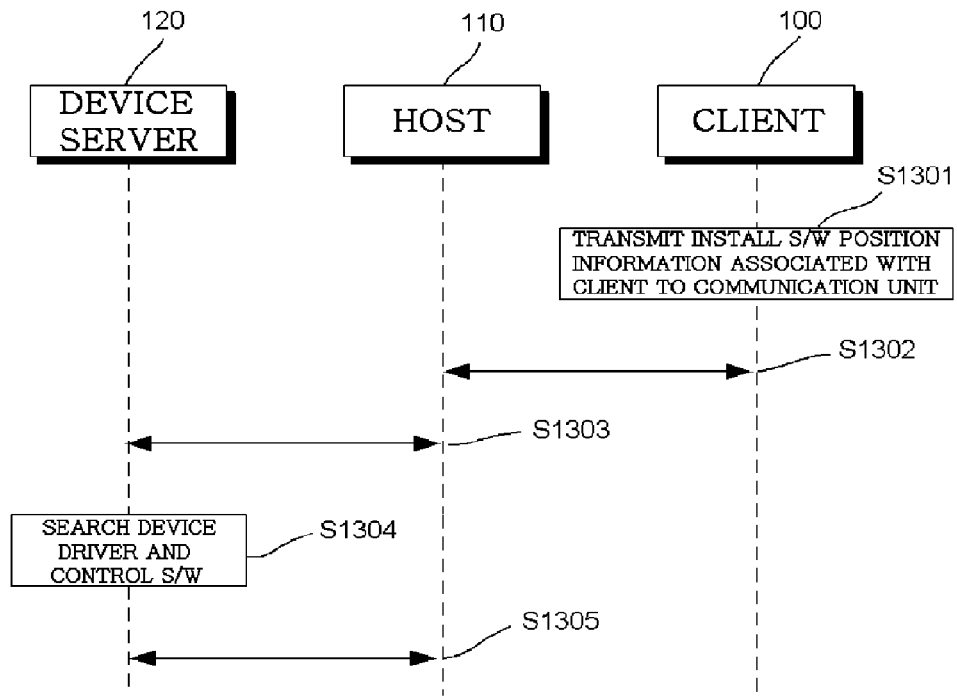
FIGS. 13 and 14 are signal flowcharts showing a device driver and control S/W transmission procedure according to the third embodiment of the present invention.
Figure 14:
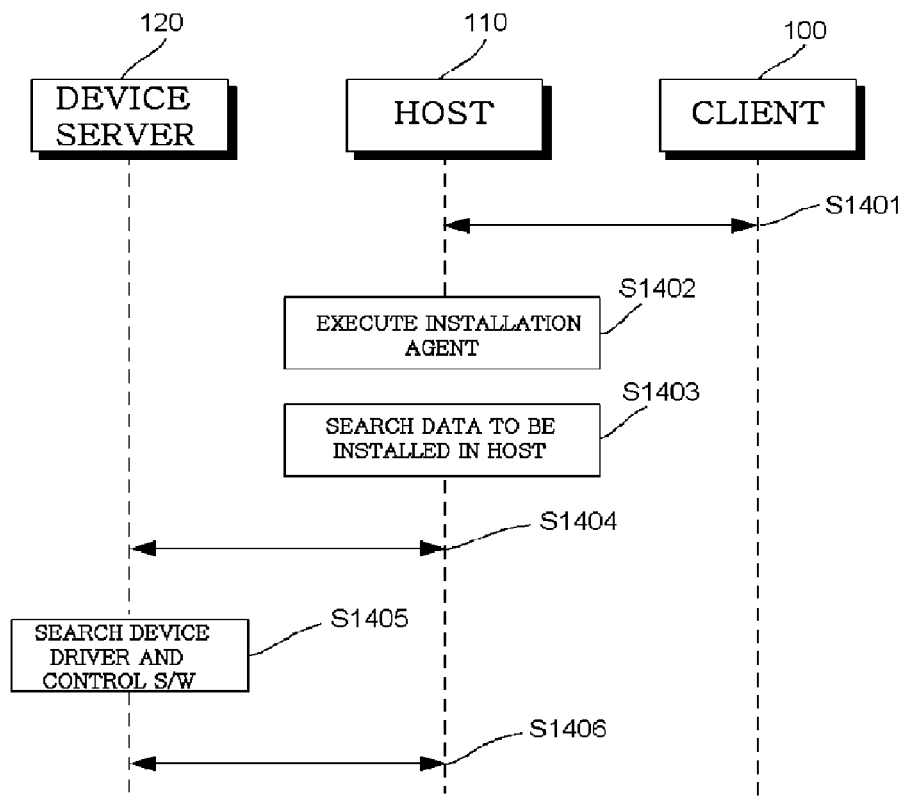

FIGS. 13 and 14 are detailed signal flowcharts showing a control S/W transmission procedure according to the third embodiment of the present invention.

Referring to FIG. 13, firstly, the client 100 transmits position information of the control S/W or the like through the communication unit to the host 110 (S1301 and S1302). The host 100 has access to the device server 120 by using the position information of the control S/W or the like and requests the control S/W or the like (S1303). The device server 120 searches the requested control S/W or the like (S1304) and the control S/W or the like to the host 110 (S1305).

FIG. 14 is a signal flowchart showing a control S/W transmission procedure using an installation agent.

Referring to FIG. 14, firstly, the client 100 transmits the installation agent to the host 110 (S1401). The host 110 executes the transmitted installation agent (S1402), searches files which are to be installed in the host 110 (S1403), and requests the device server 120 to transmit the control S/W or the like (S1404).

The device server 120 searches the requested control S/W or the like (S1405) and transmits the control S/W or the like to the host 110 (S1406).

Figure 15:
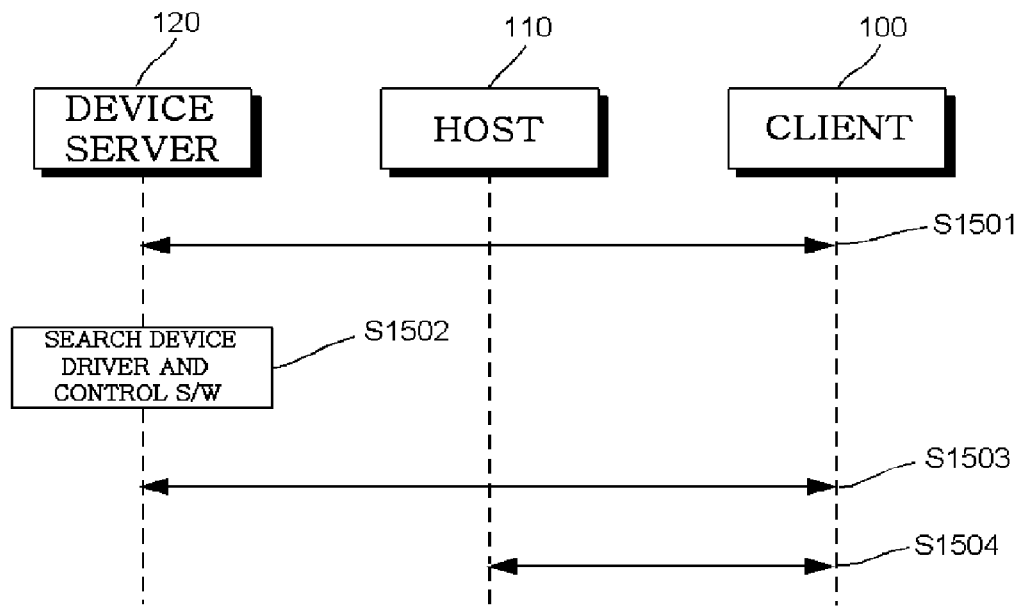
FIG. 15 is a signal flowchart showing a device driver and control S/W transmission procedure according to the fourth embodiment of the present invention.

FIG. 15 is a signal flowchart showing a control S/W transmission procedure according to the fourth embodiment of the present invention.

Referring to FIG. 15, firstly, the client 100 has access to the device server 120 and requests a control S/W or the like (S1501). The device server 120 searches the requested control S/W or the like (S1502) and transmits the control S/W or the like to the client 100 (S1503). The client 100 transmits the transmitted control S/W or the like to the host 110 (S1504).

Figure 16:
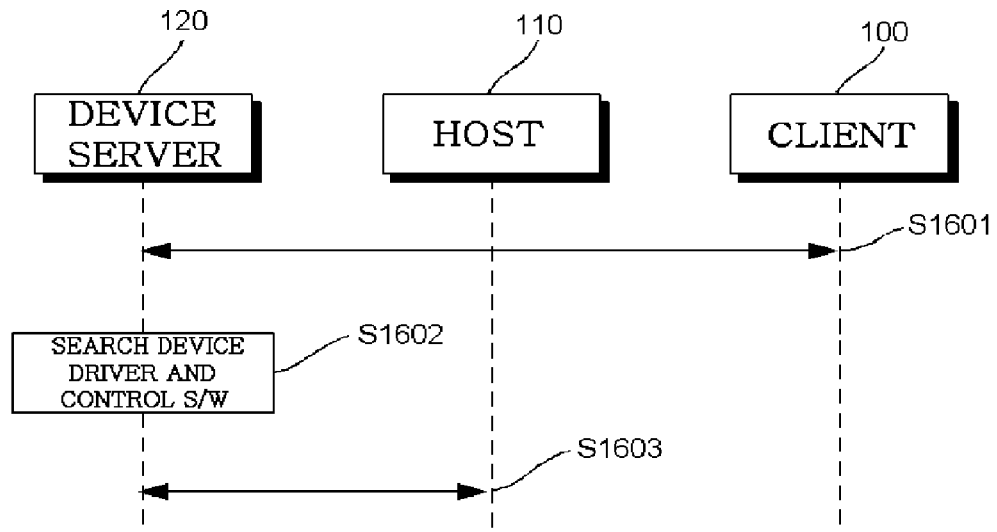
FIG. 16 is a signal flowchart showing a device driver and control S/W transmission procedure according to the fifth embodiment of the present invention.

FIG. 16 is a signal flowchart showing a control S/W transmission procedure according to the fifth embodiment of the present invention.

Referring to FIG. 16, firstly, the client 100 has access to the device server 120 and requests the device server 120 to transmit a control S/W or the like to the host 110 (S1601). The device server 120 searches the requested control S/W or the like (S1602) and transmits the control S/W or the like to the host 110 (S1603).

Figure 17:
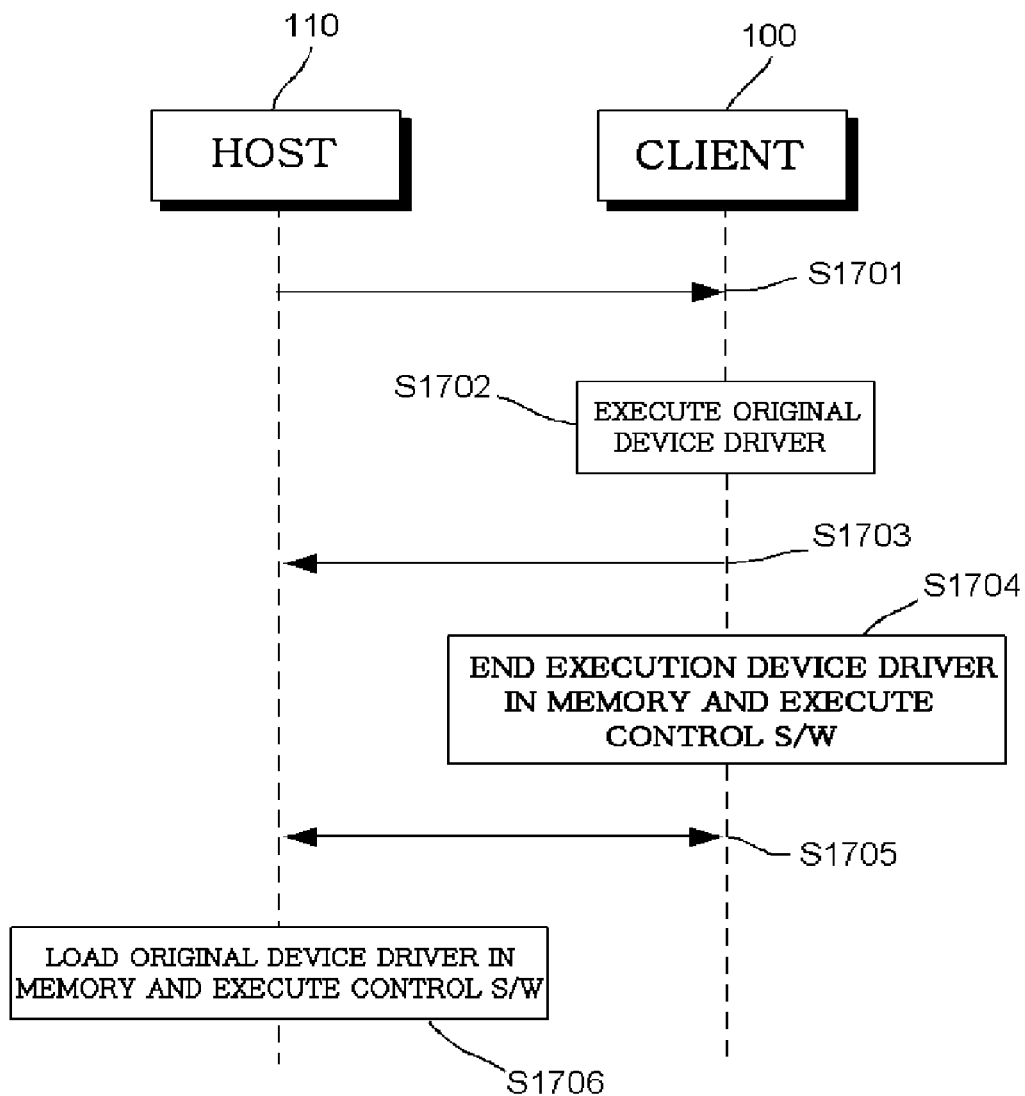
FIG. 17 is a signal flowchart showing a device identification and communication compatible operation procedure by using an original device driver according to the first to fifth embodiments of the present invention.

FIG. 17 is a signal flowchart showing a device identification and communication compatible operation procedure by using an original device driver according to the first to fifth embodiments of the present invention.

Referring to FIG. 17, if the host 110 transmits device driver install completion information to the client 100 (S1701), the client 100 executes the original device driver (S1702) and transmits original device execution information to the host 110 (S1703). Next, execution of the virtual device driver or the standard device driver ends (S1704).

After that, the host 110 identifies the client 100 by using the original device driver, so that the communication compatible operation between the host 110 and the client 100 is established (S1705). Next, the host 110 loads the original device driver on the memory and executes the control S/W (S1706).

Figure 18:
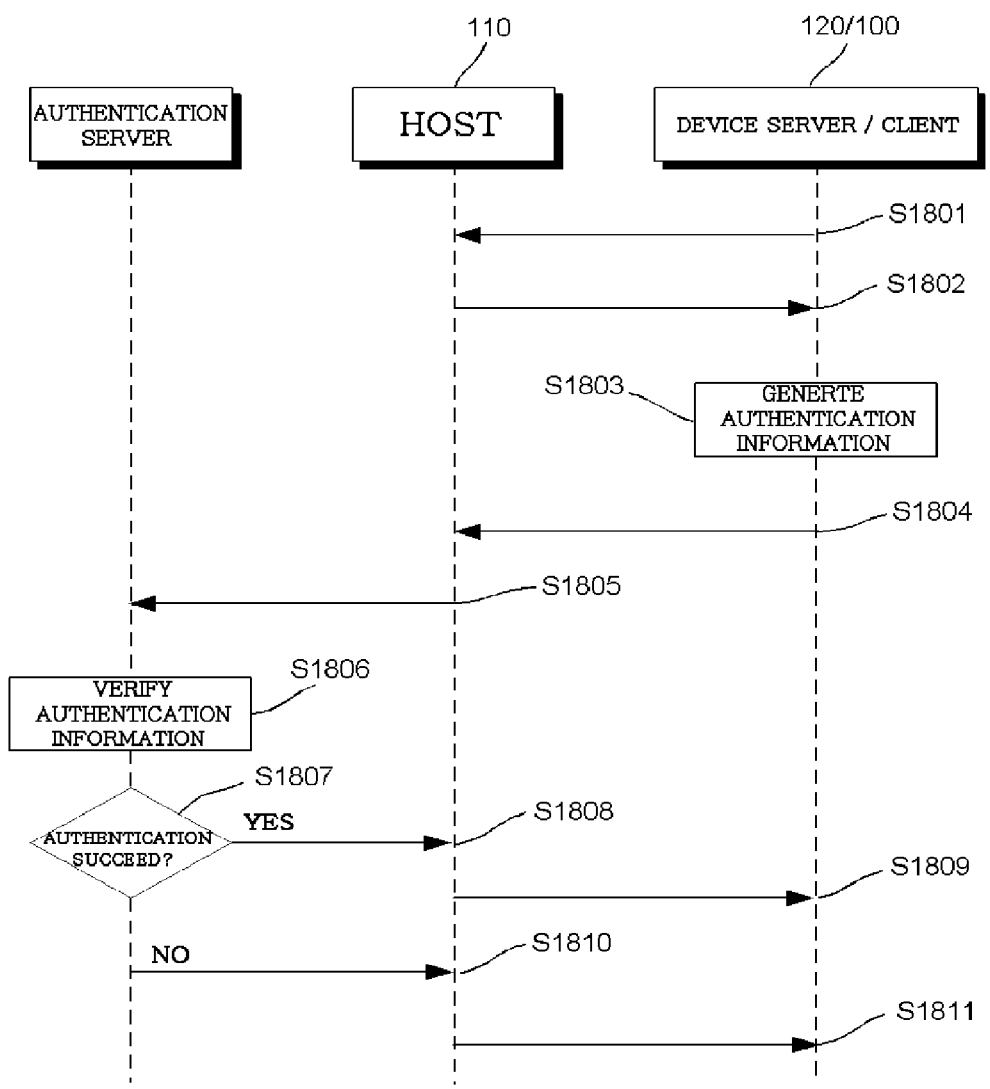
FIG. 18 is a signal flowchart showing a device driver and S/W transmission procedure by using an original device driver according to the first to fifth embodiments of the present invention.

FIG. 18 is a signal flowchart showing a control S/W transmission authentication procedure according to the first to fifth embodiments of the present invention.

Referring to FIG. 18, after access for control S/W transmission between the host 110 and the client 100 or between host 110 and the device server 120 is made, the host 110 requests the client 100 or the device server 120 to transmit authentication information (S1801 and S1802). The client 100 or the device server 120 generates the authentication information and transmits the authentication information to the host 110 (S1803 and S1804).

The host 110 transmits the transmitted authentication information to an authentication server (S1805), and the authentication server verifies the transmitted authentication information to determine whether or not authentication succeeds (S1806 and S1807).

As a determination result, if the authentication succeeds, authentication success information is transmitted to the host 110 (S1808), and the host 110 receiving the authentication success information analyzes the authentication success information and informs the client 100 or the device server 120 of control S/W transmission permission (S1809).

As a determination result, if the authentication does not succeed, authentication failure information is transmitted to the host 110 (S1810), and the host 110 receiving the authentication failure information analyzes the authentication failure information and informs the client 100 or the device server 120 of control S/W transmission prohibition (1811).

Figure 19:
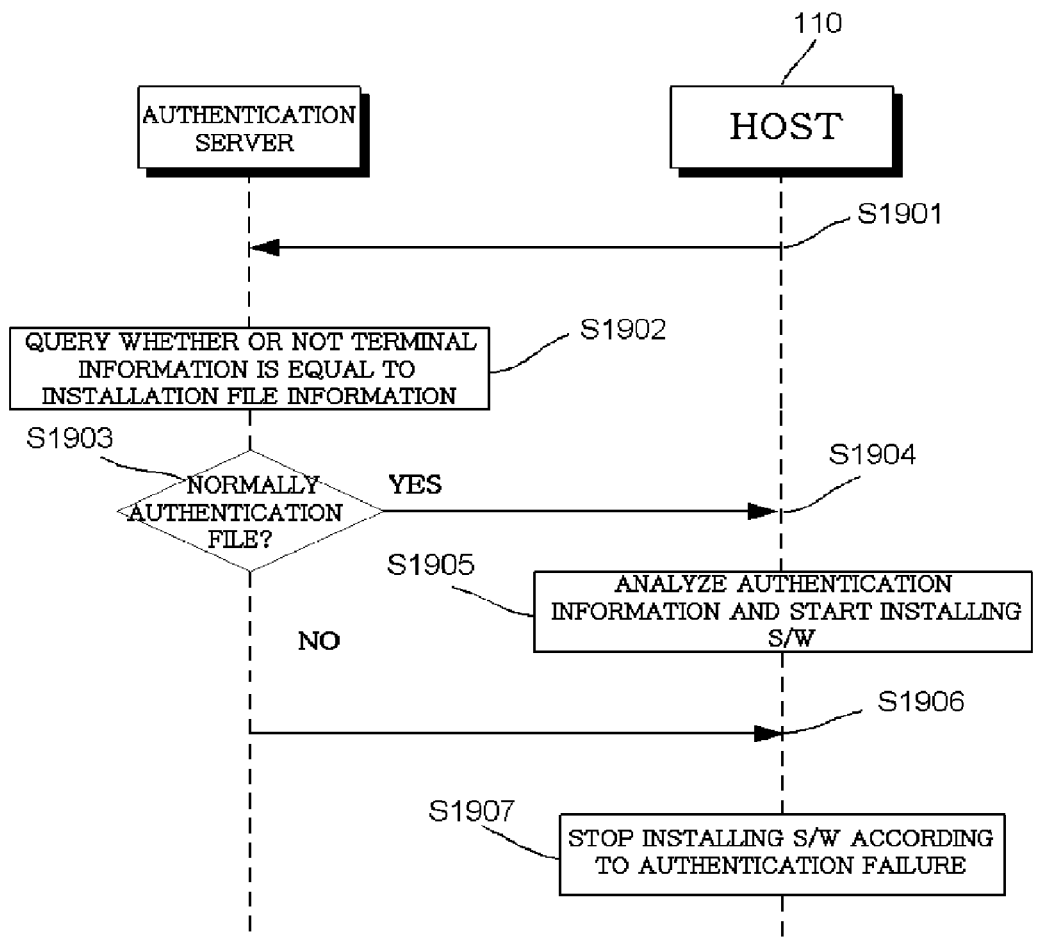
FIG. 19 is a signal flowchart showing a device driver and S/W installation authentication procedure according to the first to fifth embodiments of the present invention.

FIG. 19 is a signal flowchart showing a control S/W installation authentication procedure according to the first to fifth embodiments of the present invention.

Referring to FIG. 19, firstly, the host 110 transmits terminal information and installation file information for control S/W installation file authentication to the authentication server (S1901). The authentication server queries database (D/B) whether or not the transmitted terminal information is equal to the installation file information to determine whether or not the authentication file is a normally authenticated file (S1902 and S1903).

As a determination result, if the authentication file is a normally authenticated file, authentication success information is transmitted to the host 110 (S1904), and the host 110 analyzes the transmitted authentication success information to start installing the control S/W or the like (S1905).

As a determination result, if the authentication file is not a normally authenticated file, authentication failure information is transmitted to the host 110 (S1906), and the host 110 analyzes the transmitted authentication failure information to end installing the control S/W or the like (S1907).

INDUSTRIAL APPLICABILITY

According to the present invention, at the same time that a client is connected to a host, control software capable of controlling the client is automatically installed in the host and executed, so that it is possible for the client to easily control the client.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, it is natural that such modifications belong to the scope of the present invention.

What is claimed is:

1. A plug-and-play apparatus, comprising:
a client device configured to be communicatively connected to a host device, the client device including at least a portion of memory configured to store computer code for allowing the host device to identify and control the client device,
the client device being configured such that the host device is not required to have pre-installed the computer code for allowing the host device to identify and control the client device, prior to being communicatively connected to the client device,
the client device further being configured such that after the client device is communicatively connected to the host device, the client device is configured to transfer the computer code for allowing the host device to identify and control the client device to the host device for installation;

the client device further being configured to send authentication information to the host device for authentication purposes.

2. The plug-and-play apparatus of claim 1, wherein the portion of memory includes a non-volatile memory.

3. The plug-and-play apparatus of claim 1, wherein the client device is configured to be communicatively connected to the host device utilizing a wireless connection.

4. The plug-and-play apparatus of claim 1, wherein the client device is configured to be communicatively connected to the host device utilizing a wired connection.

5. The plug-and-play apparatus of claim 1, wherein the client device is configured to be communicatively connected to the host device utilizing at least one of an Infrared data association communication (IrDA) connection, a universal serial bus (USB) connection, an IEEE 1394 connection, an RS-232 connection, an RS422 connection, an RS-485 connection, or a Bluetooth connection.

6. The plug-and-play apparatus of claim 1, wherein the client device is configured to be communicatively connected to the host device utilizing a Bluetooth connection.

7. The plug-and-play apparatus of claim 1, wherein the client device is configured to be communicatively connected to the host device utilizing a universal serial bus (USB) connection.

8. The plug-and-play apparatus of claim 1, wherein the computer code for allowing the host device to identify and control the client device includes a client device driver.

9. The plug-and-play apparatus of claim 1, wherein the computer code for allowing the host device to identify and control the client device includes a virtual device driver.

10. The plug-and-play apparatus of claim 1, wherein the computer code for allowing the host device to identify and control the client device includes control software for controlling the client device.

11. The plug-and-play apparatus of claim 1, wherein the client device is configured to transfer the computer code for allowing the host device to identify and control the client device to the host device for automatic installation on the host device.

12. The plug-and-play apparatus of claim 1, wherein the client device is configured to transfer the computer code for allowing the host device to identify and control the client device to the host device for automatic installation and automatic execution by the host device.

13. The plug-and-play apparatus of claim 1, wherein the host device includes a computer.

14. The plug-and-play apparatus of claim 1, wherein the client device includes one of a PDA, a smart phone, an MP3 player, or a digital camera.

15. The plug-and-play apparatus of claim 1, wherein the client device includes one of a computer, a facsimile, a scanner, a printer, a TV, a set top box, a DVD player, a VCR, a camcorder, a home game machine, a coffee makers, an electric rice cooker, a refrigerator, a washing machine, a microwave oven, a digital camera, or a remote controller.

16. The plug-and-play apparatus of claim 1, wherein the client device includes a memory device.

17. A system, comprising: the plug-and-play apparatus of claim 1, and a host device capable of receiving the computer code.

18. The plug-and-play apparatus of claim 1, wherein the client device is further configured to:

load a virtual device driver;

execute the virtual device driver; and transmit a client device connection response signal to the host device, the client device connection response signal including a standard client device driver that is configured to be loaded on the host device and configured for the host device to identify the client device and perform an operation utilizing the standard client device driver.

19. The plug-and-play apparatus of claim 1, wherein the computer code for allowing the host device to identify and control the client device includes control software for controlling the client device and a client device driver for identifying the client device.

20. The plug-and-play apparatus of claim 1, wherein the client device is configured such that:

the client device transfers an installation agent to the host device, wherein the installation agent is configured to:

search the host device for data for use in allowing the host device to identify and control the client device, and determine additional data for use in allowing the host device to identify and control the client device, such that the additional data is received from the client device.

21. The plug-and-play apparatus of claim 1, wherein the client device is configured to execute a device response process and transmit a client connection response signal to the host device.

22. The plug-and-play apparatus of claim 1, wherein the client device is further configured to transfer to the host device particular code for searching the host device for data for use in allowing the host device to identify or control the client device, such that additional data for use in allowing the host device to identify or control the client device is identified for receipt from the client device.

23. The plug-and-play apparatus of claim 1, wherein the client device is further configured to transfer to the host device particular code for causing execution of a process on the host device that results in data for use in allowing the host device to identify or control the client device being identified for receipt from the client device.

24. The plug-and-play apparatus of claim 23, wherein the client device is further configured such that the particular code includes an installation agent; the authentication information is generated by the client device; the computer code includes at least one of device driver or control software; the authentication information is sent before at least one of the computer code being transferred or installation of the computer code; the authentication information is sent in response to a request from the host device; and the data for use in allowing the host device to identify or control the client device is for use in allowing the host device to identify and control the client device.

25. The plug-and-play apparatus of claim 1, and further comprising at least one component configured to:

cause transmission of at least a portion of the authentication information from the host device to an authentication server, allow receipt of an authentication result from the authentication server, and analyze the authentication result.

26. A plug-and-play apparatus, comprising:

a client device configured to be communicatively connected to a host device via a wired connection, the client device including at least a portion of memory configured to store computer code for allowing the host device to identify and control the client device, the client device being configured for wireless communication via a wireless network;

the client device being configured such that the host device is not required to have pre-installed the computer code for allowing the host device to identify and control the client device, prior to being communicatively and operably connected to the client device;

the client device further being configured such that after the client device is communicatively connected to the host device, the client device is configured to transfer the computer code for allowing the host device to identify and control the client device to the host device;

the client device further being configured to send information to the host device, the information including authentication information.

27. The plug-and-play apparatus of claim 26, wherein the client device is configured such that:

the client device transfers an agent to the host device, wherein the agent is configured to:
search the host device for data for use in allowing the host device to identify or control the client device,
determine additional data for use in allowing the host device to identify or control the client device,
receive the additional data from the client device.

28. The plug-and-play apparatus of claim 26, wherein the client device is configured to transfer the computer code for allowing the host device to identify and control the client device to the host device for automatic installation on the host device; and the information is sent in response to a request from the host device.

29. The plug-and-play apparatus of claim 26, wherein the client device is further configured to:
load a virtual device driver;
execute the virtual device driver; and
transmit a client device connection response signal to the host device, the client device connection response signal including a standard client device driver that is configured to be loaded on the host device and configured for the host device to identify the client device and perform an operation utilizing the standard client device driver.

30. The plug-and-play apparatus of claim 26, wherein the client device is further configured to cause transmission of at least a portion of the information from the host device to a server via the wireless network, such that response information is received from the server via the wireless network, for use.

31. The plug-and-play apparatus of claim 26, and further comprising at least one component configured to:
transmit at least a portion of the authentication information from the host device to an authentication server via the wireless network,
receive authentication result information from the authentication server via the wireless network, and
analyze the authentication result information for informing of a permission or a prohibition.

32. A plug-and-play apparatus, comprising:
a client device configured to be communicatively connected to a host device via a wired connection, the client device including at least a portion of memory configured to store computer code for allowing the host device to identify and control the client device, the client device being configured for wireless communication via a wireless network;

the client device being configured such that the host device is not required to have pre-installed the computer code for allowing the host device to identify and control the client device, prior to being communicatively connected to the client device;

the client device further being configured such that after the client device is communicatively connected to the host device, the client device is configured to transfer the computer code for allowing the host device to identify and control the client device to the host device for installation;

the client device further being configured to send authentication information to the host device;

the client device further being configured to transfer to the host device particular code for causing execution of a process on the host device that results in data for use in allowing the host device to identify or control the client device being identified for receipt from the client device.

33. A plug-and-play apparatus, comprising:
a client device configured to be communicatively connected to a host device via a wired connection, the client device including at least a portion of memory configured to store computer code for allowing the host device to identify and control the client device, the client device being configured for wireless communication via a wireless network;

the client device being configured such that the host device is not required to have pre-installed the computer code for allowing the host device to identify and control the client device, prior to being communicatively and operably connected to the client device;

the client device further being configured such that after the client device is communicatively connected to the host device, the client device is configured to transfer the computer code for allowing the host device to identify and control the client device to the host device for installation;

the client device further being configured to send information to the host device via the wired connection, the information including authentication information;

wherein the plug-and-play apparatus is operable such that a transmission is caused to be sent from the host device to a server via the wireless network utilizing the information, and, in response, result information is provided by the server via the wireless network.

34. The plug-and-play apparatus of claim 33, wherein the client device is further configured to transfer to the host device particular code for searching the host device for data for use in allowing the host device to identify or control the client device, such that additional data for use in allowing the host device to identify or control the client device is identified for receipt from the client device.

35. A system, comprising:
a client device configured to be communicatively connected to a host device via a wired connection, the client device including at least a portion of memory configured to store computer code for allowing the host device to identify and control the client device, the client device being configured for wireless communication via a wireless network;

the client device being configured such that the host device is not required to have pre-installed the computer code for allowing the host device to identify and control the client device, prior to being communicatively and operably connected to the client device;

the client device further being configured such that after the client device is communicatively connected to the host device, the client device is configured to transfer the computer code for allowing the host device to identify and control the client device to the host device for installation;

the client device further being configured to send information to the host device via the wired connection, the information including authentication information; and a server being configured to receive at least a portion of the information via the wireless network, and send response information from the server via the wireless network.

36. The system of claim 35, wherein the server is at least one of an authentication server, a service server, or a device server; and the authentication information is required for use of the client device.

37. The system of claim 35, wherein the send result information includes authentication result information.

38. The system of claim 35, wherein the server is operable such that the response information is sent to the host device.

39. The system of claim 35, wherein the client device is operable to receive client information as a result of the response information.

* * * * *